(12) United States Patent
Takayanagi et al.

(10) Patent No.: US 8,805,167 B2
(45) Date of Patent: Aug. 12, 2014

(54) VIDEO RECORDING AND REPRODUCING APPARATUS AND METHOD FOR CONTROLLING THE SAME

(75) Inventors: Daisuke Takayanagi, Kawasaki (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1459 days.

(21) Appl. No.: 11/954,584

(22) Filed: Dec. 12, 2007

(65) Prior Publication Data

US 2008/0253744 A1 Oct. 16, 2008

(30) Foreign Application Priority Data

Dec. 15, 2006 (JP) ................................. 2006-338677

(51) Int. Cl.
*H04N 5/76* (2006.01)

(52) U.S. Cl.
USPC .......................................... 386/297; 386/329

(58) Field of Classification Search
USPC .......................................... 386/109, 297, 329
See application file for complete search history.

(56) References Cited

U.S. PATENT DOCUMENTS

| 6,370,198 | B1 * | 4/2002 | Washino ................ 375/240.26 |
| 6,798,458 | B1 * | 9/2004 | Unemura ..................... 348/448 |
| 7,660,510 | B2 * | 2/2010 | Kawahara et al. ........... 386/281 |
| 7,831,128 | B2 * | 11/2010 | Tanaka .......................... 386/341 |
| 2002/0118296 | A1 * | 8/2002 | Schwab et al. ............... 348/441 |
| 2004/0076060 | A1 * | 4/2004 | Tsurusaki et al. ............ 365/222 |
| 2004/0141718 | A1 | 7/2004 | Miyagoshi et al. |
| 2006/0285818 | A1 * | 12/2006 | Murabayashi ................. 386/46 |
| 2007/0157234 | A1 * | 7/2007 | Walker ........................... 725/38 |
| 2009/0290857 | A1 * | 11/2009 | Itani .............................. 386/131 |

FOREIGN PATENT DOCUMENTS

JP 2004-228837 A 8/2004

\* cited by examiner

*Primary Examiner* — Amare F Tabor
(74) *Attorney, Agent, or Firm* — Canon USA, Inc., IP Division

(57) ABSTRACT

Some embodiments of the present invention provide a video recording and reproducing apparatus capable of obtaining a video content, recording the video content in a recording unit, and executing an up-converting process on the recorded video content, the video recording and reproducing apparatus comprising a selecting unit configured to select a video content, a retrieving unit configured to retrieve specification information for the video content selected by the selecting unit, and a determining unit configured to determine whether or not to provide a user with a notification that inquires about whether or not to execute an up-converting process on the video content in accordance with the specification information retrieved by the retrieving unit.

16 Claims, 13 Drawing Sheets

FIG. 2

| Data Structure | No. of Bits | Bit Stream | Meaning |
|---|---|---|---|
| component_descriptor ( ) { | | | |
|   descriptor_tag | 8 | uimsbf | |
|   descriptor_length | 8 | uimsbf | |
|   reserved_future_use | 4 | bslbf | |
|   stream_content | 4 | uimsbf | Content of Component |
|   component_type | 8 | uimsbf | Type of Component |
|   component_tag | 8 | uimsbf | |
|   ISO_639_language_code | 24 | bslbf | |
|   for (i=0 ; i<N ; i++) { | | | |
|     text_char | 8 | uimsbf | Description of Component |
|   } | | | |
| } | | | |

FIG. 3

| Content of Component | Type of Component | Description |
|---|---|---|
| 0 × 00 | 0 × 00 - 0 × FF | Reserved for future use |
| 0 × 01 | 0 × 00 | Reserved for future use |
| 0 × 01 | 0 × 01 | Video 480i(525i), Aspect Ratio 4:3 |
| 0 × 01 | 0 × 02 | Video 480i(525i), Aspect Ratio 16:9, with Pan Vector |
| 0 × 01 | 0 × 03 | Video 480i (525i), Aspect Ratio 16:9, without Pan Vector |
| 0 × 01 | 0 × 04 | Video 480i(525i), Aspect Ratio > 16:9 |
| 0 × 01 | 0 × 05 - 0 × A0 | Reserved for future use |
| 0 × 01 | 0 × A1 | Video 480p(525p), Aspect Ratio 4:3 |
| 0 × 01 | 0 × A2 | Video 480p(525p), Aspect Ratio 16:9, with Pan Vector |
| 0 × 01 | 0 × A3 | Video 480p(525p), Aspect Ratio 16:9, without Pan Vector |
| 0 × 01 | 0 × A4 | Video 480p(525p), Aspect Ratio > 16:9 |
| 0 × 01 | 0 × A5 - 0 × B0 | Reserved for future use |
| 0 × 01 | 0 × B1 | Video 1080p(1125ip), Aspect Ratio 4:3 |
| 0 × 01 | 0 × B2 | Video 1080p(1125ip), Aspect Ratio 16:9, with Pan Vector |
| 0 × 01 | 0 × B3 | Video 1080p(1125ip), Aspect Ratio 16:9, without Pan Vector |
| 0 × 01 | 0 × B4 | Video 1080p(1125ip), Aspect Ratio > 16:9 |

FIG. 6

| Settings of Scheduling of Recording |
|---|
| Program Title: Baseball Game<br><br>Do you want to schedule recording of the following?<br><br>Date: xx yy  xx yy<br>Time: aa:bb  -  cc:bb<br><br>[Yes]　　　[No] |

FIG. 7

| Type of Component | Description | Necessity of Up-conversion |
|---|---|---|
| 0 × 00 - 0 × FF | Reserved for future use | |
| 0 × 00 | Reserved for future use | |
| 0 × 01 | Video 480i(525i), Aspect Ratio 4:3 | Necessary |
| 0 × 02 | Video 480i(525i), Aspect Ratio 16:9, with Pan Vector | Necessary |
| 0 × 03 | Video 480i(525i), Aspect Ratio 16:9, without Pan Vector | Necessary |
| 0 × 04 | Video 480i(525i), Aspect Ratio > 16:9 | Necessary |
| 0 × 05 - 0 × A0 | Reserved for future use | |
| 0 × A1 | Video 480p(525p), Aspect Ratio 4:3 | Unnecessary |
| 0 × A2 | Video 480p(525p), Aspect Ratio 16:9, with Pan Vector | Unnecessary |
| 0 × A3 | Video 480p(525p), Aspect Ratio 16:9, without Pan Vector | Unnecessary |
| 0 × A4 | Video 480p(525p), Aspect Ratio > 16:9 | Unnecessary |
| 0 × A5 - 0 × B0 | Reserved for future use | |
| 0 × B1 | Video 1080p(1125ip), Aspect Ratio 4:3 | Unnecessary |
| 0 × B2 | Video 1080p(1125ip), Aspect Ratio 16:9, with Pan Vector | Unnecessary |
| 0 × B3 | Video 1080p(1125ip), Aspect Ratio 16:9, without Pan Vector | Unnecessary |
| 0 × B4 | Video 1080p(1125ip), Aspect Ratio > 16:9 | Unnecessary |

FIG. 8

| Video Coding Scheme | Video Format | Aspect Ratio | ... | Time required for up-converting 1-hour content |
|---|---|---|---|---|
| MPEG-2 Video | 1080i | 16:9 | | 4 hours |
| | 480p | 16:9 | | 12 hours |
| | 480i | 16:9 | ... | 16 hours |
| | | 4:3 | | 16 hours |
| | 720p | 16:9 | | 4 hours |
| | 1080p | 16:9 | | 2 hours |

FIG. 9

Up-conversion Settings

This content is in standard definition (SD).
Do you want to up-convert this?

Yes    No

The up-conversion will end at 1 PM on July 31.

FIG. 10

| Content ID | Content Title | Year | Month | Day | Start | End | Type of Component | Up-conversion Selection Flag |
|---|---|---|---|---|---|---|---|---|
| 0001 | Baseball Game | 2006 | 7 | 30 | 8:00 PM | 9:00 PM | 0 × 01 | X |
| 0002 | Old Movie | 2006 | 7 | 30 | 8:30 PM | 9:30 PM | 0 × 03 | X |
| 0003 | Amazing Tennis | 2006 | 7 | 31 | 11:00 PM | 11:30 PM | 0 × A3 | |
| 0004 | Morning News | 2006 | 8 | 1 | 5:00 AM | 8:00 AM | 0 × B3 | |
| 0005 | Quiz Show | 2006 | 8 | 3 | 10:00 PM | 10:30 PM | 0 × B3 | |

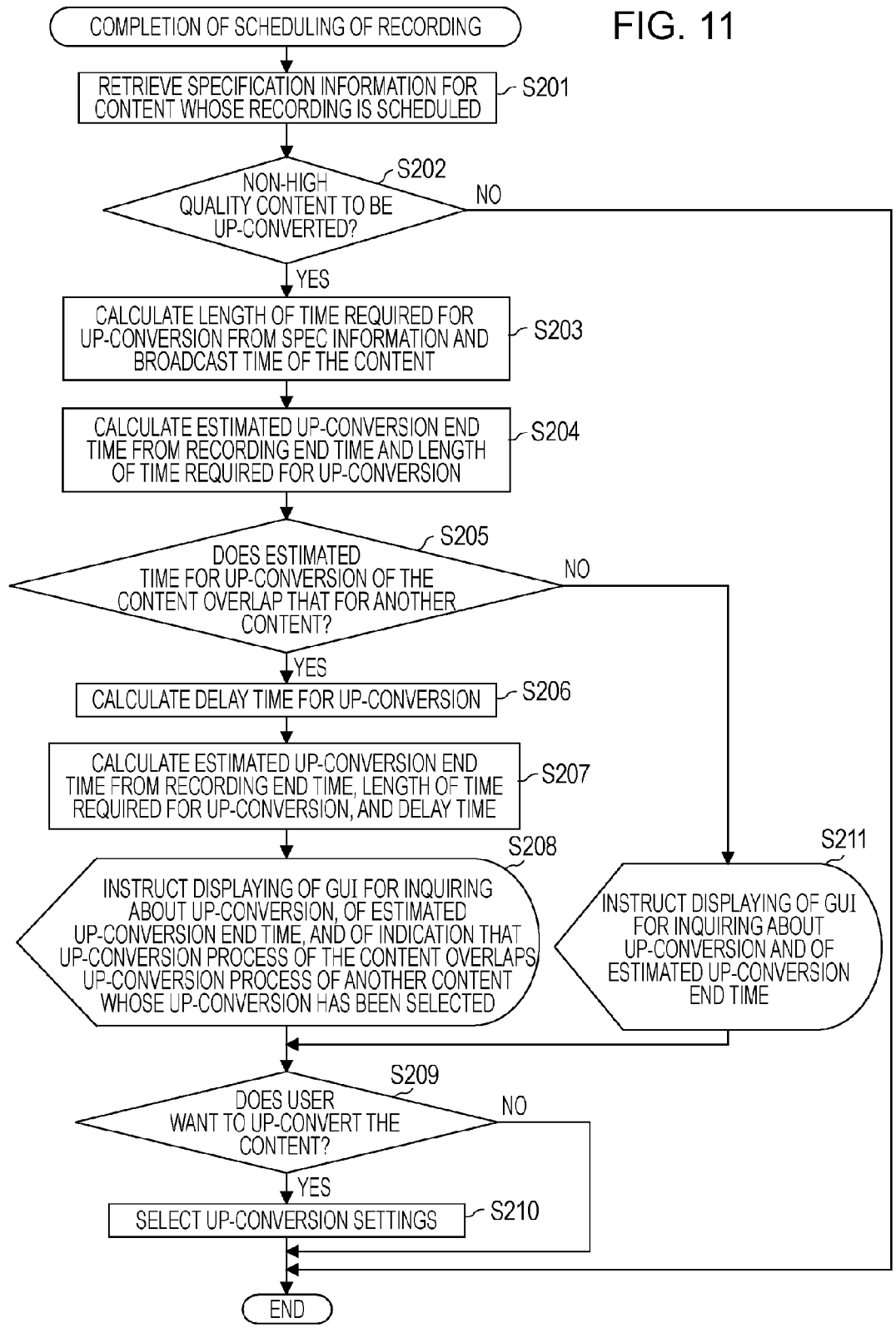

VIDEO RECORDING AND REPRODUCING APPARATUS AND METHOD FOR CONTROLLING THE SAME

BACKGROUND OF THE INVENTION

1. Field of the Invention

The present invention relates to a video recording and reproducing apparatus that records video data received from broadcasting or communications and reproduces the record video data and to a method for controlling the same. In particular, it relates to a video recording and reproducing apparatus that has the function of improving image quality of recorded video data and to a method for controlling the same.

2. Description of the Related Art

The maximum number of effective pixels in current standards for digital broadcasting in Japan is 1,920×1,080 pixels in the high definition (HD) format. However, techniques for broadcasting high-definition contents that have a large number of pixels exceeding the number of pixels in HD are under development. Examples of such techniques include the super high definition (SHD) format and the ultra-high definition (UHD) format being developed by NHK (Japan Broadcasting Corporation). The maximum number of pixels in techniques now being developed is 7,680×4,320 pixels, which significantly exceeds the number of pixels in the HD format. For the SHD and UHD formats, a higher quality of not only video but also audio is under development. For example, a system that has 22.2 channels as voice channels has been produced and demonstrated.

However, it is estimated that contents broadcast with a lower image quality and audio quality in, for example, the standard definition (SD) coexist with contents having a larger number of pixels.

A technique for improving the image quality and audio quality of non-high quality contents that have a smaller number of pixels and a smaller number of voice channels than those of high quality contents using a high-performance arithmetic unit and a complex algorithm (hereinafter referred to as up-converting) over time is proposed.

There are techniques for automatically improving the image quality of a video content depending on the remaining amount of a storage medium when the video content is stored thereon to efficiently up-convert a video content (e.g., broadcasting program). One such technique is described in Japanese Patent Laid-Open No. 2004-228837.

Unfortunately, for the technique described in this patent document, the image quality of a program desired by a user is not always improved. For example, in this technique, even when improvement in the image quality of a program to be recorded is not desired, if the storage medium has enough available storage space, the content is automatically subjected to a process of improving the image quality to be stored. If this content is an originally high-quality content, the degree of improvement may be less than expected although the content has been up-converted over time.

Because the image quality of video contents currently broadcast is either SD or HD, a user can make the settings for an up-converting process by choosing between only two things. However, as described above, contents with higher qualities, such as in the SHD or UHD format, will become commercially available in the near future. For video transmission via a network, various kinds of video contents from a content that has a smaller number of pixels and a lower bit rate than a content with the SD image quality to a content whose image quality is equal to the HD image quality are now available. In an environment where a wide variety of video contents are available, it is difficult for an ordinary user to determine what video content can be up-converted to what quality level.

SUMMARY OF THE INVENTION

The present invention provides a video recording and reproducing apparatus that automatically identifies a video content to be up-converted and that enables a user to easily make up-conversion settings and also provides a method for controlling the video recording and reproducing apparatus.

According to a first aspect of the present invention, a video recording and reproducing apparatus capable of obtaining a video content, recording the video content in a recording unit, and executing an up-converting process on the recorded video content is provided. The video recording and reproducing apparatus includes a selecting unit configured to select a video content, a retrieving unit configured to retrieve specification information for the video content selected by the selecting unit, and a determining unit configured to determine whether or not to provide a user with a notification that inquires about whether or not to execute an up-converting process on the video content in accordance with the specification information retrieved by the retrieving unit.

According to a second aspect of the present invention, a method for controlling a video recording and reproducing apparatus capable of obtaining a video content, recording the video content in a recording unit, and executing an up-converting process on the recorded video content is provided. The method includes selecting a video content, retrieving specification information for the video content selected by the selecting step, and determining whether or not to provide a user with a notification that inquires about whether or not to execute an up-converting process on the video content in accordance with the specification information retrieved by the retrieving step.

Further features of the present invention will become apparent from the following description of exemplary embodiments (with reference to the attached drawings).

BRIEF DESCRIPTION OF THE DRAWINGS

FIG. 2 shows details of component descriptors in the Association of Radio Industries and Businesses (ARIB) standards.

FIG. 3 shows details of component types in the ARIB standards.

FIG. 6 shows an example of a screen for scheduling of recording according to the first embodiment.

FIG. 7 shows an example of a table for use in determination whether or not to execute an up-converting process according to the first embodiment.

FIG. 8 shows an example of a table that stores estimated lengths of time for up-converting processes according to the first embodiment.

FIG. 9 shows an example of a setting screen for use in making the settings for an up-converting process according to the first embodiment.

FIG. 10 shows an example of a content management table according to the first embodiment.

FIG. 11 is a flowchart of a process performed in a second embodiment of the present invention.

DESCRIPTION OF THE EMBODIMENTS

Figure 1:
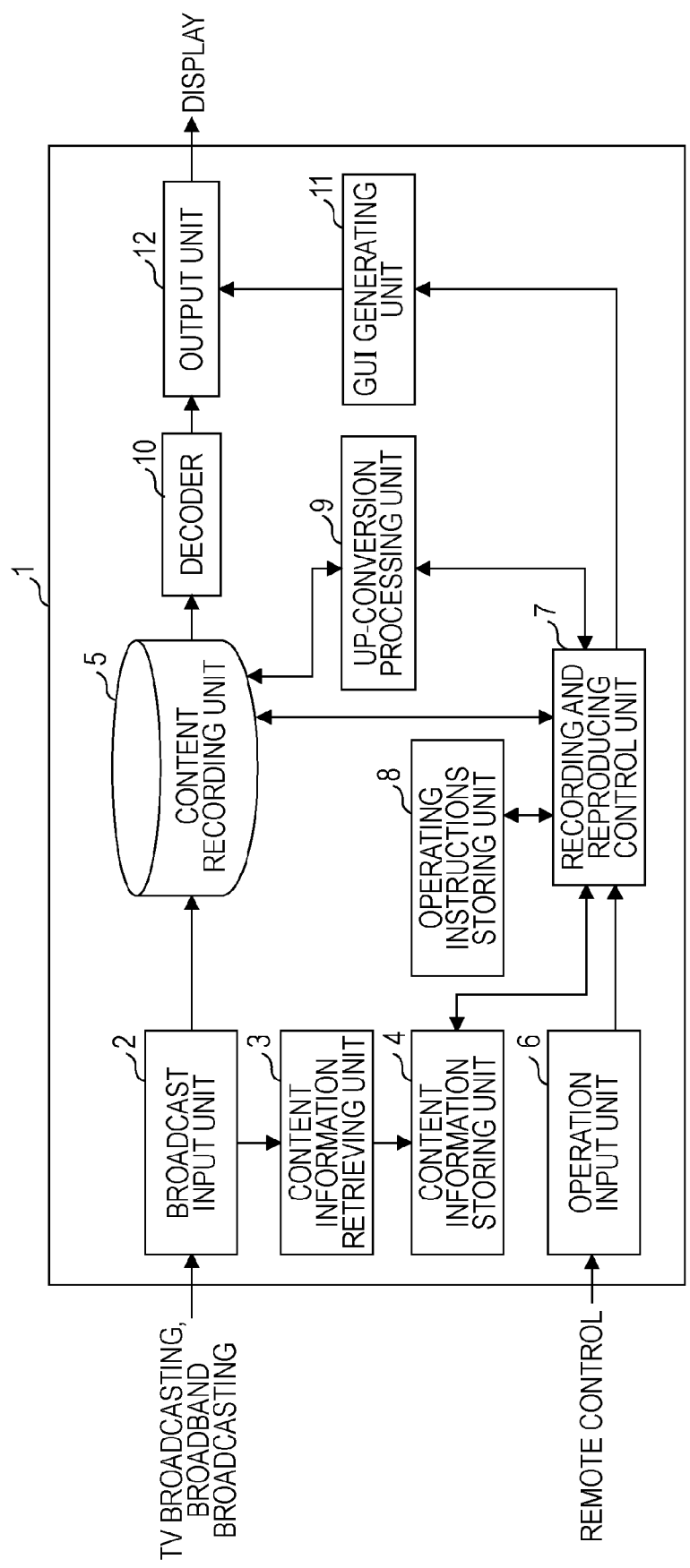
FIG. 1 is a block diagram that illustrates a structure of a video recording and reproducing apparatus according to an embodiment of the present invention.

Exemplary embodiments of the present invention will now be described in detail in accordance with the accompanying drawings, in which like reference characters designate the same or similar parts throughout the figures thereof.

First Embodiment

In the present embodiment, a video recording and reproducing apparatus will be described below that enables a user to determine whether or not to execute an up-converting process on a content to be recorded when the user schedules recording of a video content. It is characteristic of the present embodiment to selectively enable or disable the displaying of a graphical user interface (GUI) for scheduling execution of an up-converting process depending on a determination whether a video content whose recording is desired by a user is a non-high quality content to be up-converted.

FIG. 1 illustrates an example of a structure of a video recording and reproducing apparatus to which an embodiment of the present invention is applied.

Functional blocks in a video recording and reproducing apparatus 1 illustrated in FIG. 1 will first be described below. The video recording and reproducing apparatus 1 can be, for example, an apparatus capable of recording and reproducing a video content (e.g., a hard-disk drive (HDD) recorder).

A broadcast input unit 2 is configured to receive a broadcast signal from terrestrial digital broadcasting, satellite digital broadcasting, and broadband broadcasting, decode the signal, and correct errors. In addition to video data and audio data, content specification information indicating the type and attribute of a content and other data are superimposed on the broadcast signal.

A content information retrieving unit 3 retrieves the content specification information from the broadcast signal. An example of the content specification information is a component descriptor defined by the Association of Radio Industries and Businesses (ARIB), the component descriptor being retrievable in the terrestrial digital broadcasting.

The component descriptor defines information about a broadcast content (e.g., a program) stored in a table called an event information table (EIT) in service information (SI) contained in a broadcast signal. A data structure of the component descriptor is shown in FIG. 2. The EIT is multiplexed in the broadcast signal to inform a receiver of information about the program, such as the contents of the program, broadcast time, and description of the contents. A part of concrete content information described in the component descriptor, in particular, the content of a component and the type of the component are shown in FIG. 3. For example, a video content having the content of the component of 0x01 and the type of the component of 0xB4 represents that the resolution and the scan mode of the video content is 1,080i and the aspect ratio is larger than 16:9. Hereinafter information that defines the image quality and the audio quality, such as the resolution, the scan mode, the number of audio channels, and the bit rate, is referred to as specification information.

One feature of the SI is that information on a video content is obtainable before the video content is broadcast. That is, a content provider (e.g., a broadcasting station) transmits a broadcast wave in which SI for a video content (e.g., a program) to be broadcast at a future time is multiplexed. A receiver can obtain the SI and create information about a program required for displaying an electronic program guide (EPG). As a result, at the time a user schedules recording of a video content using the EPG, specification information on the video content to be recorded can be obtained in advance.

A content information storing unit 4 stores SI for a content retrieved by the content information retrieving unit 3 (hereinafter referred to as content information). More specifically, examples of the content information include the content ID, including specification information (e.g., the type of a component), the title of the content, and the broadcast time. A procedure up to retrieval of content information from a broadcast signal is described below.

First, the content information retrieving unit 3 detects whether a broadcast signal contains content information (SI data). If the SI data is detected, the content information retrieving unit 3 retrieves data regarding the content information from the broadcast signal. In particular, in the present embodiment, for example, as illustrated in FIG. 2, specification information (e.g., the type of a component) is also retrieved from a component descriptor corresponding to each content.

The retrieved content-information data is stored by the content information storing unit 4. An information table is then generated that stores information for all contents retrievable from the SI data. Each content in the information table is associated with its component type information retrieved by the content information retrieving unit 3.

The content information storing unit 4 stores in advance an ARIB standards information table (FIG. 3) that associates the content of a component defined in the ARIB standards with the type of the component. In the present embodiment, the ARIB standards information table may be stored in a storage area other than the content information storing unit 4.

A content recording unit 5 is a mass storage device, such as a hard disk drive. The content recording unit 5 records video data and audio data received by the broadcast input unit 2 and records an up-converted video content. Any number and type of drives may be used as long as the drive configuration is suited for recording. In the present embodiment, a video content transmitted by broadcast waves is recorded in the form of a transport stream (TS).

An operation input unit 6 is a user interface for use when a user operates the video recording and reproducing apparatus 1. For example, the operation input unit 6 detects an operation initiated by the user via a remote control and supplies it to a recording and reproducing control unit 7. The recording and reproducing control unit 7 executes control for the video recording and reproducing apparatus 1, for example, makes the content recording unit 5 perform an operation for recording a content or makes an up-conversion processing unit 9 execute an up-converting process in response to an operation initiated by a user. The recording and reproducing control unit 7 also determines whether a user-selected content is a content to be up-converted. The recording and reproducing control unit 7 also estimates an up-conversion end time. As a result, the recording and reproducing control unit 7 functions as a central processing unit (CPU) that exercises control over the video recording and reproducing apparatus 1.

An operating instructions storing unit 8 stores, for example, instructions to schedule recording or execute an up-converting process initiated by a user. More specifically, the operating instructions storing unit 8 stores the content ID, title, broadcast start time, and broadcast end time for a video content to be recorded at the time the user schedules recording of the video content. These pieces of information are stored by retrieval of data for the target content from the content table stored in the content information storing unit 4. The operating instructions storing unit 8 stores flag information for identifying a content to be up-converted at the time of selecting execution of an up-converting process. As a result, data maintained in the operating instructions storing unit 8 is a content management table shown in FIG. 10. The details of the content management table will be described below.

The up-conversion processing unit 9 executes an up-converting process on a stream of a video content stored in the content recording unit 5 in accordance with an instruction stored in the operating instructions storing unit 8. The up-converting process used in the present embodiment indicates an image-quality improving process or an audio-quality improving process that is virtually impossible to be performed in real time. For example, image-quality and audio-quality correction capabilities in current common digital televisions carry out the correction process before a video content received from broadcast waves is displayed on a displaying unit (e.g., a display). That is, the correction process can be carried out in real time. In other words, adjustment of the image quality and audio quality within the actual time of a video content (for example, one hour for a one-hour program) is real-time processing.

However, in order to create a video with higher definition and resolution by reproducing details using a complex algorithm that refers to a plurality of video frames, real-time processing is difficult because computing and correcting take time. As in the case of a video, in order to reproduce an audio having a high degree of fidelity to the original sound and the realism, it is difficult under present circumstances to process a received video content in real time and output the processed video content because analyzing and computing take time. In the present embodiment, a process of improving the image quality and audio quality of a video content taking more time than the actual time of the video content is defined as an up-converting process. As a result, it is necessary to store a video content to be subjected to the up-converting process in a storage unit (e.g., a hard disk).

Figure 4:
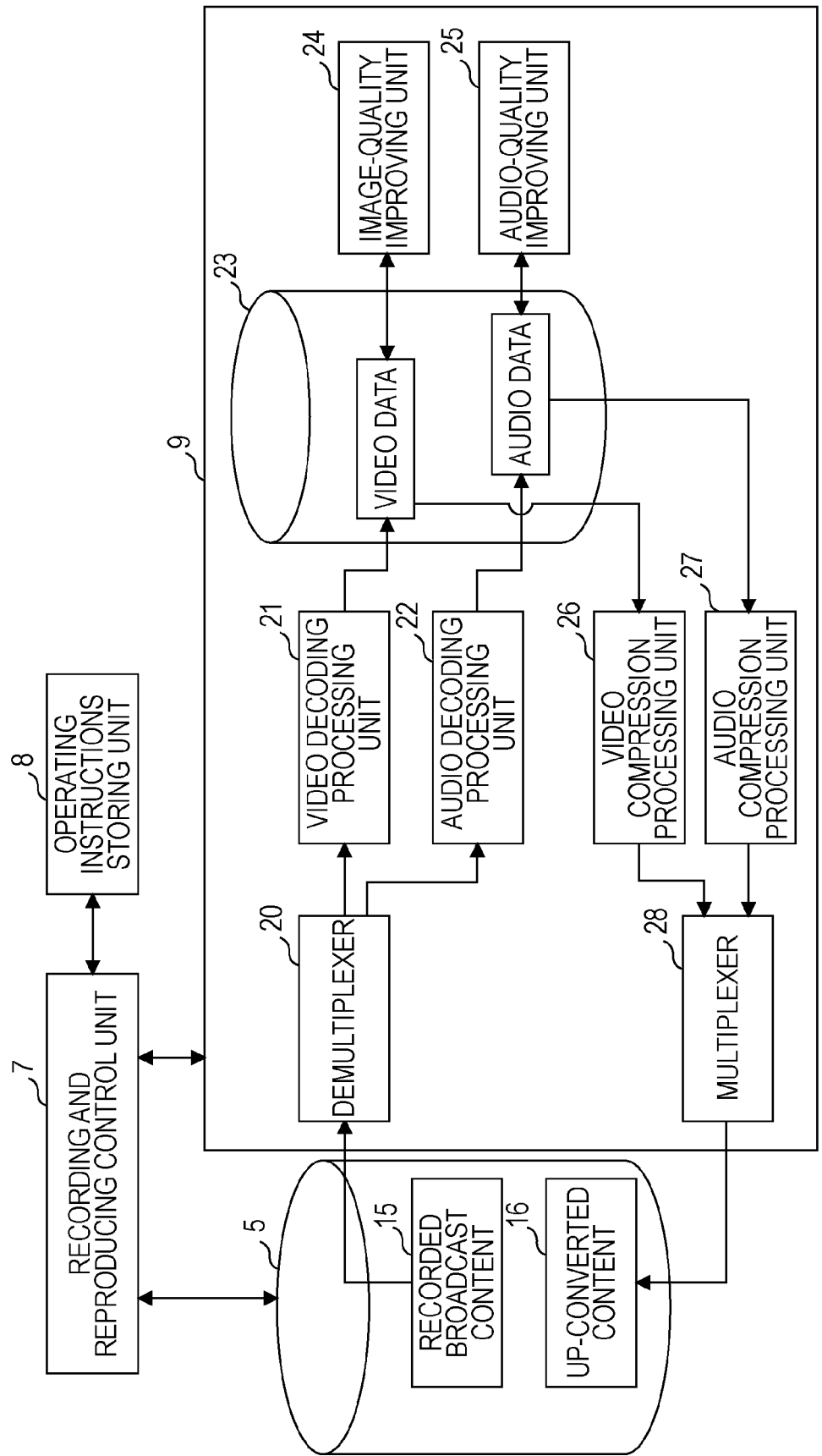
FIG. 4 is a block diagram that illustrates a structure of an up-conversion processing unit.

The up-conversion processing unit 9 in the present embodiment can have a structure illustrated in FIG. 4. The structure of the up-conversion processing unit 9 will now be described below.

The recording and reproducing control unit 7 refers to the operating instructions storing unit 8 and checks whether an instruction to execute an up-converting process is present. If such an up-conversion instruction is present, the recording and reproducing control unit 7 instructs the content recording unit 5 and the up-conversion processing unit 9 for the up-converting process. In response to this instruction, the up-conversion processing unit 9 receives a recorded broadcast content 15 in part or in entirety from the content recording unit 5 and separates a video signal and an audio signal by a demultiplexer 20. These signals are decoded by a video decoding processing unit 21 and an audio decoding processing unit 22, and the decoded signals are temporarily stored as video data and audio data in a content cache 23. The stored video data and audio data are subjected to an up-converting process in an image-quality improving unit 24 and an audio-quality improving unit 25. The up-converted data is stored in the content cache 23 again.

The image-quality improving unit 24 can perform a class classification adaptive process, as described in Japanese Patent Laid-Open No. 7-321662. This is merely an example. The image-quality improving process in the present embodiment may be any process as long as it is an image-quality improving process that is difficult to be performed in real time, as previously described.

The audio-quality improving unit 25 can perform a process of modulating audio data after over-sampling of a sampling frequency of the audio data to several tens of times, as described in Japanese Patent Laid-Open NO. 9-261071. This is merely an example.

After completion of the image-quality improving process on the video data and the audio-quality improving process on the audio data, the video data is compressed by a video compression processing unit 26 and the audio data is compressed by an audio compression processing 27 if needed. The compressed video data and the compressed audio data are multiplexed by a multiplexer 28 into video-multiplexed and audio-multiplexed TS data, and the multiplexed TS data is stored in the content recording unit 5 as up-converted content 16.

Referring back to FIG. 1, the video recording and reproducing apparatus 1 is described again. A decoder 10 decodes a video content recorded in the content recording unit 5 into video data and audio data.

In response to an instruction from the recording and reproducing control unit 7, a GUI generating unit 11 generates GUI data to be output to a screen.

An output unit 12 receives the GUI data generated by the decoder 10 and the GUI generating unit 11 and outputs it to a display or other similar units. Although not shown, audio data decoded by the decoder is output to a speaker or other similar units via the output unit.

In the present embodiment, the content information storing unit 4 and the operating instructions storing unit 8 are independent storage units different from each other. However, these storage units may be formed as a single memory. In the present embodiment, content specification information required for determination whether or not to execute an up-converting process and operating instructions to execute an up-converting process executed by a user are stored.

A procedure up to selection of execution or non-execution of an up-converting process will now be described with reference to the flowchart of FIG. 5. In the present embodiment, for the sake of clarity of description, after all video contents are recorded in the content recording unit 5, the recorded video contents are subjected to an up-converting process. However, a video content may be recorded and up-converted in synchronization with each other.

A user schedules recording of a video content by operating a GUI illustrated in FIG. 6. However, the GUI is not limited to this. Any kind of the GUI and any representation of the GUI may be used. FIG. 6 illustrates an example of a screen for settings of scheduling of recording generated by the GUI generating unit 11 under control of the recording and reproducing control unit 7 and appearing on a display. This screen shows the title of a program whose recording is scheduled by a user ("Baseball Game") and the broadcast time of the program (video content). The user determines whether or not to schedule recording with this settings. If the user wants to schedule the recording, the user selects the "Yes" button to confirm the selection. When scheduling of recording performed by the user is completed, the content ID, title, broadcast start time, and broadcast end time for a program whose recording is scheduled is stored in the content management table (FIG. 10) in the operating instructions storing unit 8. At this time, the type of a component of the content is stored in association with the content ID.

Figure 5:
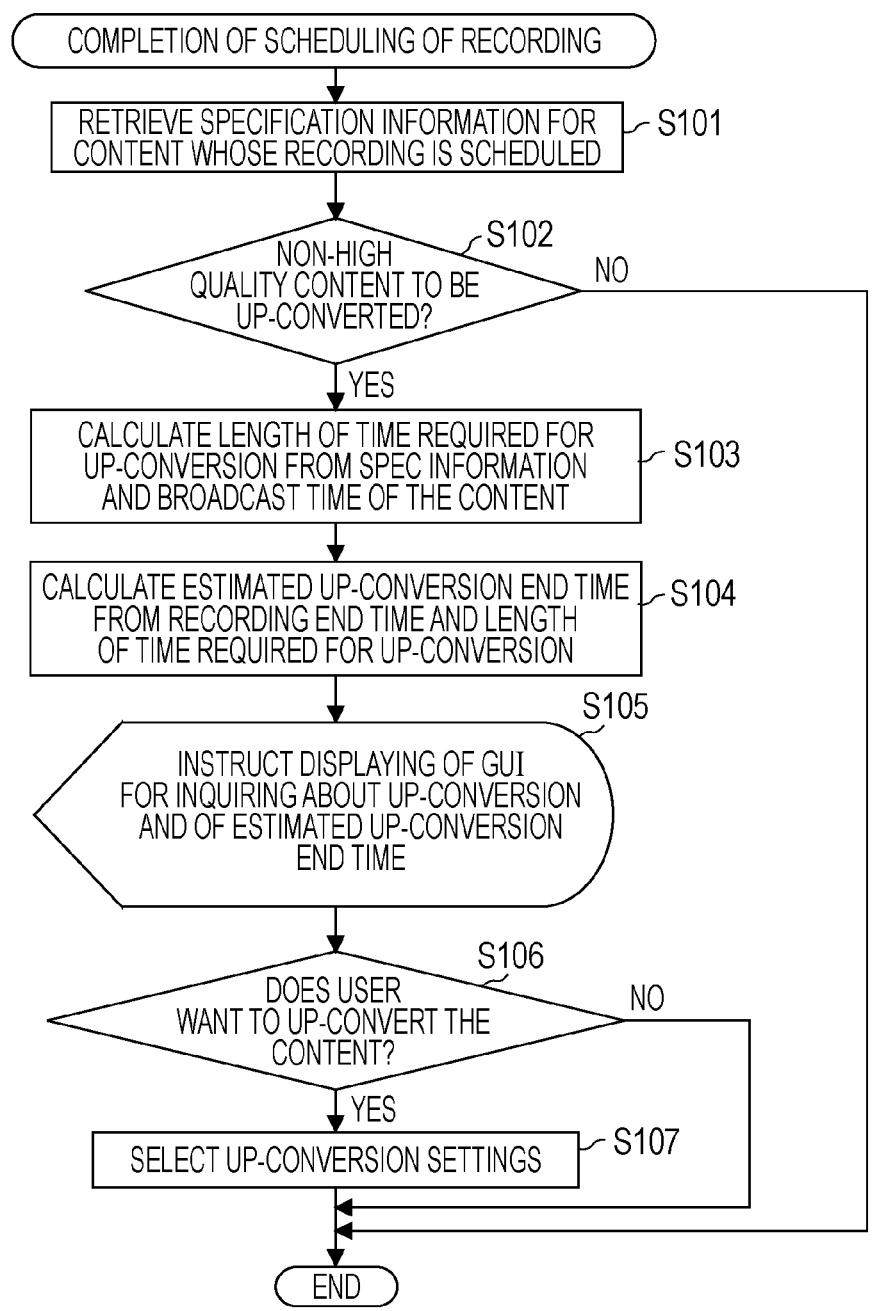
FIG. 5 is a flowchart of a process performed in a first embodiment of the present invention.

The process described in the flowchart of FIG. 5 is performed after the completion of scheduling of recording of a video content. However, the process of FIG. 5 may be performed in parallel with the process of scheduling recording, and a GUI that can accept an instruction from the user may be displayed after the completion of the process of scheduling recording. Alternatively, the process described in the flowchart of FIG. 5 may be performed in advance, and an input from the user may be accepted concurrently with the process of scheduling recording.

The user needs to select a video content to determine whether or not to execute an up-converting process. In the present embodiment, scheduling of recording of a video content performed by the user is associated with an operation of selecting a video content. Therefore, the operation of scheduling recording of a video content corresponds to a selecting unit configured to select a video content. That is, a video content to be subjected to determination whether an up-converting process is to be executed thereon can be automatically selected by the operation of scheduling recording of the video content performed by the user. This is substantially the same as in second and third embodiments, which will be described below.

In step S101, the recording and reproducing control unit 7 retrieves specification information matching with specification information for a content whose recording is scheduled (component type) stored in the operating instructions storing unit 8 from the ARIB standards information table stored in the content information storing unit 4.

In step S102, the recording and reproducing control unit 7 determines whether the content whose recording is scheduled is a non-high quality content to be up-converted. This determination is made by, for example, previously storing a table shown in FIG. 7 in the recording and reproducing control unit 7, comparing the specification information for the content whose recording is scheduled retrieved in step S101 with the table data, and determining whether the content is to be up-converted. The table shown in FIG. 7 is a necessity determination table in which the necessity and unnecessity of an up-converting process for specification information currently defined in the ARIB are preset. By checking the specification information added to the content whose recording is scheduled with the necessity determination table, it is determined whether it is necessary to up-convert this content whose recording is scheduled.

In step S102, if the recording and reproducing control unit 7 determines that the content whose recording is scheduled is a non-high quality content to be up-converted, flow proceeds to step S103.

In step S102, if the recording and reproducing control unit 7 determines that the content whose recording is scheduled is a high quality content that there is no need to be up-converted, flow ends without selecting execution of the up-converting process. The selection of execution of the up-converting process will be described below.

In step S103, the recording and reproducing control unit 7 calculates the length of a time period required for an up-converting process of the content whose recording is scheduled from the broadcast start time and end time of the content whose recording is scheduled stored in the operating instructions storing unit 8 and an estimated time table, which will be described below. For example, an estimated time table shown in FIG. 8 that contains information indicating an estimated length of time required for an up-converting process and supporting various kinds of video formats is previously stored in the recording and reproducing control unit 7. The recording and reproducing control unit 7 calculates the length of time required for an up-converting process from information of the estimated time table and time information on the content whose recording is scheduled.

FIG. 8 shows the estimated time table that stores values (time lengths) calculated in advance corresponding to the performance of the up-conversion processing unit 9 and algorithms. For example, the table defines that for a video content whose video coding scheme is MPEG-2 Video, video required for an up-converting process of this video content is (length of time of the video content)×16 hours.

Concrete estimated lengths of time shown in FIG. 8 largely depend on the performance of the up-conversion processing unit 9, a unit applied as the up-converting process, and a used algorithm. Thus, the table may store values supporting various cases.

In FIG. 8, MPEG-2 Video is illustrated as the video coding scheme. However, values of other video coding schemes, such as H.264/AVC, may be stored. The video format and the aspect ratio may be replaced with the component type described above. An estimated time table that reflects information about audio data may be generated in advance, and information about estimated time corresponding to combinations of audio data and video data may be stored.

In step S104, the recording and reproducing control unit 7 calculates an estimated up-conversion end time from the broadcast end time of the content whose recording is scheduled stored in the operating instructions storing unit 8 and the calculated length of time required for the up-converting process. The recording and reproducing control unit 7 instructs the GUI generating unit 11 to display a GUI that enables the user to select the execution of an up-converting process and that includes the estimated up-conversion end time.

In step S105, the GUI generating unit 11 can generate, for example, a GUI for up-conversion settings shown in FIG. 9 that indicates the estimated up-conversion end time. To inquire of the user about whether or not to execute an up-converting process, the generated GUI data is output to the display via the output unit 12 to provide the user with the data.

FIG. 9 shows an example of a GUI screen for use when the user selects execution or non-execution of an up-converting process on the video content whose recording is scheduled. On this displayed screen, the user considers whether or not to execute an up-converting process on the content whose recording is scheduled on the basis of estimated up-conversion end time and other conditions and selects "Yes" or "No". This selection is the branch condition in step S106.

If the user requests execution of an up-converting process in the GUI for selecting scheduling of an up-converting process (presses the "Yes" button), flow proceeds to step S107.

In step S107, the recording and reproducing control unit 7 can, for example, add an up-conversion flag to the content ID in the content management table illustrated in FIG. 10. This enables selection of execution of an up-converting process on the video content whose recording is scheduled. FIG. 10 shows an example of the content management table. The content management table retrieves data for the content whose recording is scheduled from all content information stored in the content information storing unit 4 and stores a flag indicating whether or not to execute an up-converting process. As a result, the recording and reproducing control unit 7 can identify a content whose recording is scheduled or a content to be up-converted by referring to the content management table.

In step S106, if the user requests non-execution of an up-converting process (presses the "No" button), flow ends without selecting execution of the up-converting process. As a result, the video content whose recording is scheduled is not up-converted.

With the flowchart shown in FIG. 5, the procedure for selecting execution or non-execution of an up-converting process on a video content whose recording is scheduled is described. In the present embodiment, when an operation of recording a video content whose recording is scheduled is completed, if an added up-conversion flag is present, the up-converting process is executed.

In the present embodiment, depending on specification information for a video content to be recorded, displaying and non-displaying of a GUI that inquires of the user about whether or not to execute an up-converting process is selectively switched. This enables the user to know the effectiveness of an up-converting process of the video content when the video content is recorded in the recording unit without intention. In addition, the user can select execution or non-execution of an up-converting process of a video content together when scheduling recording of the video content.

The user can know the required time important for determination whether or not to execute an up-converting process before selecting the up-conversion settings.

In the first embodiment, broadcast reception is estimated as the form of distribution of a video content. However, the present invention is not limited to broadcasting. The present invention is applicable to video transmission over networks as long as specification information for a video content can be retrieved. The embodiments described below also are not limited to broadcasting.

Second Embodiment

The video recording and reproducing apparatus to which the present invention is applied according to the second embodiment will now be described below. In the present embodiment, at the time of scheduling of recording of a video content, the time when an up-converting process of the video content is executed overlaps the time when an up-converting process of another video content is executed.

In the present embodiment, the video recording and reproducing apparatus described in the first embodiment is used by way of example. The structure similar to that in the first embodiment is not described here. The procedure up to retrieval of content specification information from a broadcast signal is substantially the same as in the first embodiment.

A procedure up to selection of execution or non-execution of an up-converting process after completion of scheduling of recording will now be described with reference to a flowchart shown in FIG. 11. The flowchart of FIG. 11 corresponds to the flowchart of FIG. 5 described in the first embodiment.

First, in step S201, the recording and reproducing control unit 7 retrieves specification information matching with specification information for a content whose recording is scheduled (component type) stored in the operating instructions storing unit 8 from the ARIB standards information table stored in the content information storing unit 4. That is, step S201 is substantially the same as step S101.

In step S202, the recording and reproducing control unit 7 determines whether the content whose recording is scheduled is a non-high quality content to be up-converted. That is, step S202 is substantially the same as step S102. The description of the determination process is not repeated here.

In step S202, if the recording and reproducing control unit 7 determines that the content whose recording is scheduled is a non-high quality content to be up-converted, flow proceeds to step S203.

In step S202, if the recording and reproducing control unit 7 determines that the content whose recording is scheduled is a high quality content that there is no need to be up-converted, flow ends without selecting execution of the up-converting process, which will be described below.

In step S203, the recording and reproducing control unit 7 calculates the length of time required for an up-converting process of the content whose recording is scheduled from the broadcast start time and end time of the content whose recording is scheduled stored in the operating instructions storing unit 8 and the estimated time table. The calculation process is substantially the same as that described for step S103, so the details are not described here.

In step S204, the recording and reproducing control unit 7 calculates an estimated up-conversion end time from the broadcast end time of the content whose recording is scheduled stored in the operating instructions storing unit 8 and the calculated length of time required for an up-converting process.

In step S205, the recording and reproducing control unit 7 determines whether the estimated time of execution of an up-converting process of the content whose recording is scheduled calculated in step S204 overlaps estimated time of execution of another video content scheduled to be up-converted.

The estimated time when another video content is up-converted can be calculated using the content management table shown in FIG. 10 and the time table shown in FIG. 8. In step S205, the determination whether there is an overlap between the up-converting processes is made by using information about the estimated time when another video content is up-converted and the estimated up-conversion end time calculated in step S204. In the present embodiment, the up-converting process is executed immediately after the completion of recording of a video content. As a result, by adding the length of time required for the up-converting process of the video content to the recording end time, the actual time of execution of the up-converting process can be calculated.

However, the execution time for the up-converting process can be adjusted independently. In this case, a table (not shown) is used that stores information about the up-conversion start time and the length of time required for the up-converting process in association with the content ID. By use of information stored in this table, the actual time for executing the up-converting process can be calculated.

In step S205, if the time required for the up-converting process of the content whose recording is scheduled does not overlap that for another content scheduled to be up-converted, the recording and reproducing control unit 7 executes step S211. Step S211 is substantially the same as step S105 shown in FIG. 5, so the details are not described here.

In step S205, if the up-converting process of the content whose recording is scheduled overlaps that for another content in terms of time, the recording and reproducing control unit 7 executes step S206.

Figure 12A:
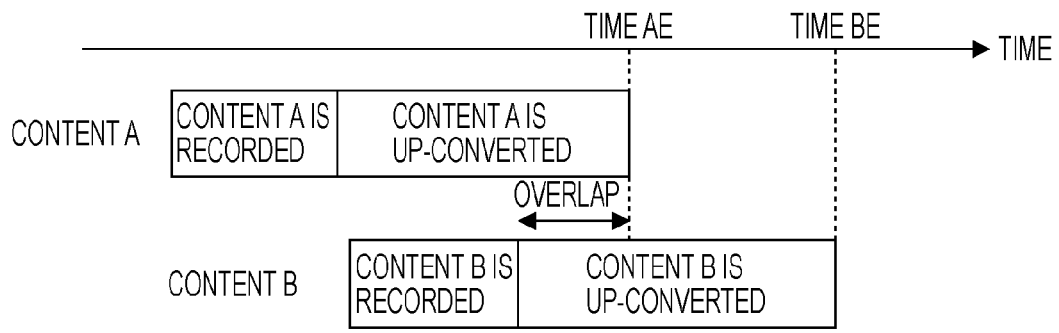
FIGS. 12A to 12C illustrate how up-converting processes overlap according to the second embodiment.

An overlapped state of a plurality of up-converting processes will now be described below with reference to the drawings. FIG. 12A is a timing chart with the progress of time indicated in a horizontal direction. Content A is a video content whose recording is previously scheduled, and the execution of an up-converting process of the content A is scheduled after the completion of the recording. Content B corresponds to a content whose recording is scheduled described above. If recording of the content B ends during execution of the up-converting process of the content A, an overlap between the up-converting processes occurs.

In the present embodiment, it is assumed that a plurality of up-converting processes should not be executed in parallel with each other because overlapping execution of up-converting processes results in a decrease in processing performance.

To this end, if a condition shown in FIG. 12A occurs, the start time for an up-converting process of the content B, whose up-converting process will start later, is delayed.

In step S206, the recording and reproducing control unit 7 calculates the delay time for the up-converting process of the content whose recording is scheduled.

Figure 12B:
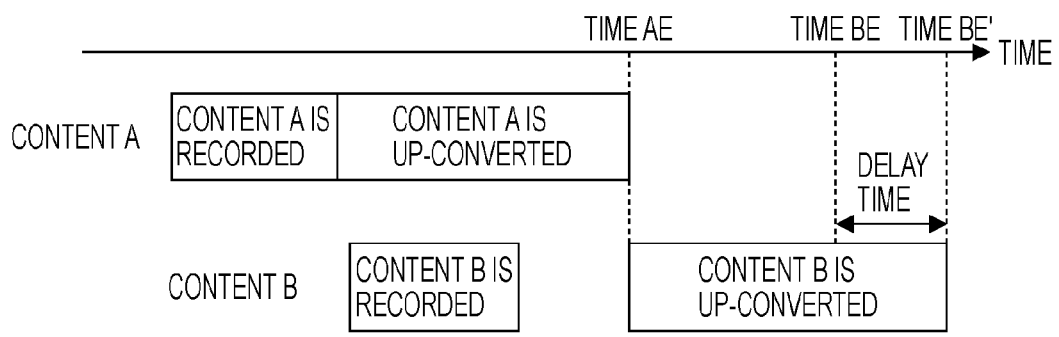

The delay time is defined as, for example, a period of time between the time BE and the time BE', as illustrated in FIG. 12B. That is, the delay time corresponds to a length of time of an overlap between the up-converting process of the content A and that of the content B.

In step S207, the recording and reproducing control unit 7 calculates an estimated up-conversion end time from the broadcast end time of the content whose recording is scheduled stored in the operating instructions storing unit 8, the calculated length of time required for an up-converting process, and the calculated delay time.

In step S208, the recording and reproducing control unit 7 instructs the GUI generating unit 11 to generate GUI data that enables the user to select the execution or non-execution of an up-converting process. The GUI generating unit 11 generates the GUI data. The generated GUI data is output to the display by the output unit 12 and provided to the user. The GUI data can be similar to that shown in FIG. 9. Information that indicates the delay time may be provided.

In step S209, if the user requests the execution of an up-converting process in the GUI for up-conversion settings (presses the "Yes" button), flow proceeds to step S210.

In step S210, the recording and reproducing control unit 7 can, for example, add an up-conversion flag to the content ID in the content management table illustrated in FIG. 10. This enables selection of execution of an up-converting process on the video content whose recording is scheduled.

In step S209, if the user requests non-execution of an up-converting process (presses the "No" button), flow ends without selecting execution of the up-converting process. As a result, the video content whose recording is scheduled is not up-converted.

In the present embodiment, depending on specification information for a video content to be recorded, displaying and non-displaying of a GUI that inquires of the user about whether or not to execute an up-converting process is selectively switched. This enables the user to know the effectiveness of an up-converting process of a video content when the video content is recorded in the recording unit without intention. In addition, the user can select execution or non-execution of an up-converting process of a video content together when scheduling recording of the video content.

The user can recognize the estimated up-conversion end time more reliably because it is determined whether there is an overlap between up-converting processes and, if the overlap exists, an estimated up-conversion end time considering the delay time is provided.

Figure 12C:
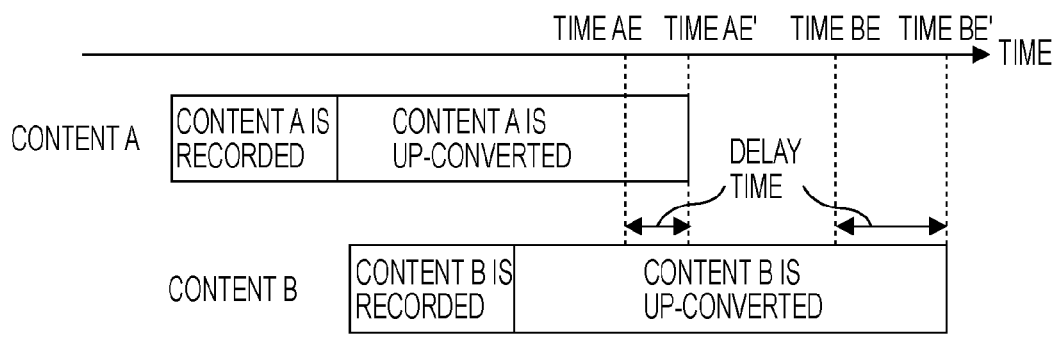

In the second embodiment, up-converting processes are controlled so as not to be overlapped. However, it is possible to execute the up-converting processes in the overlapped state. For example, as illustrated in FIG. 12C, the up-converting process of the content A and the up-converting process of the content B can be executed in parallel with each other. In this case, it is necessary to distribute resources, such as a CPU and a memory used in up-conversion, into a plurality of up-converting processes. Therefore, the up-conversion end time of the content A is behind the initial estimated time. The delay time is the time in which the time AE occurring when the up-converting processes are executed so as not to overlap each other is subtracted from the time AE' occurring when the up-converting processes are executed in parallel with each other.

The up-converting process of the content B is also delayed because the processing performance is reduced by the amount of time when the up-converting process of the content B is executed in parallel with the up-converting process of the content A. The delay time is the time in which the time BE occurring when the up-converting processes are executed so as not to overlap each other is subtracted from the time BE' occurring when the up-converting processes are executed in parallel with each other. For the time AE', a unit time (e.g., one hour) for a reference time of a content (e.g., a 10-minute content) required for the up-converting process of the content executed in parallel with another up-converting process is calculated in advance. The time AE' is calculated by dividing an actual time for an overlapping up-converting process (e.g., 30 minutes) by the reference content time (10 minutes), multiplying the unit time (1 hour) by the quotient (3), and adding the delay time (3 hours) to the time AE.

For the delay time for the content B, the overlap time of an up-converting process of the content B that is executed in parallel with the up-converting process of the content A considering the delay time (the up-conversion start time of the content B is subtracted from the time AE') is calculated. During this time period, the throughput per unit time is reduced, compared with when there is no overlap between up-converting processes. For example, in the case of an up-converting process of a 10-minute content, one hour is necessary for when the up-converting process of the content is executed so as not to overlap another up-converting process; two hours are necessary for when the up-converting process of the content is executed in parallel with another up-converting process. By calculation of the time for compensating this reduction, the delay time for the content B can be calculated.

As described above, even when a plurality of up-converting processes are executed in parallel, the estimated up-conversion end time for a video content that a user will select execution or non-execution of an up-converting process can be calculated.

Third Embodiment

The video recording and reproducing apparatus to which the present invention is applied according to the third embodiment will now be described below. In the present embodiment, at the time of scheduling of recording of a video content, a user can select the method for up-converting the content whose recording is scheduled.

In the present embodiment, the video recording and reproducing apparatus described in the first embodiment is used by way of example. The structure similar to that in the first embodiment is not described here. The procedure up to retrieval of content specification information from a broadcast signal is substantially the same as in the first embodiment.

A plurality of processing methods and processing levels are prepared in the image-quality improving unit 24 and the audio-quality improving unit 25 illustrated in FIG. 4.

Figure 13:
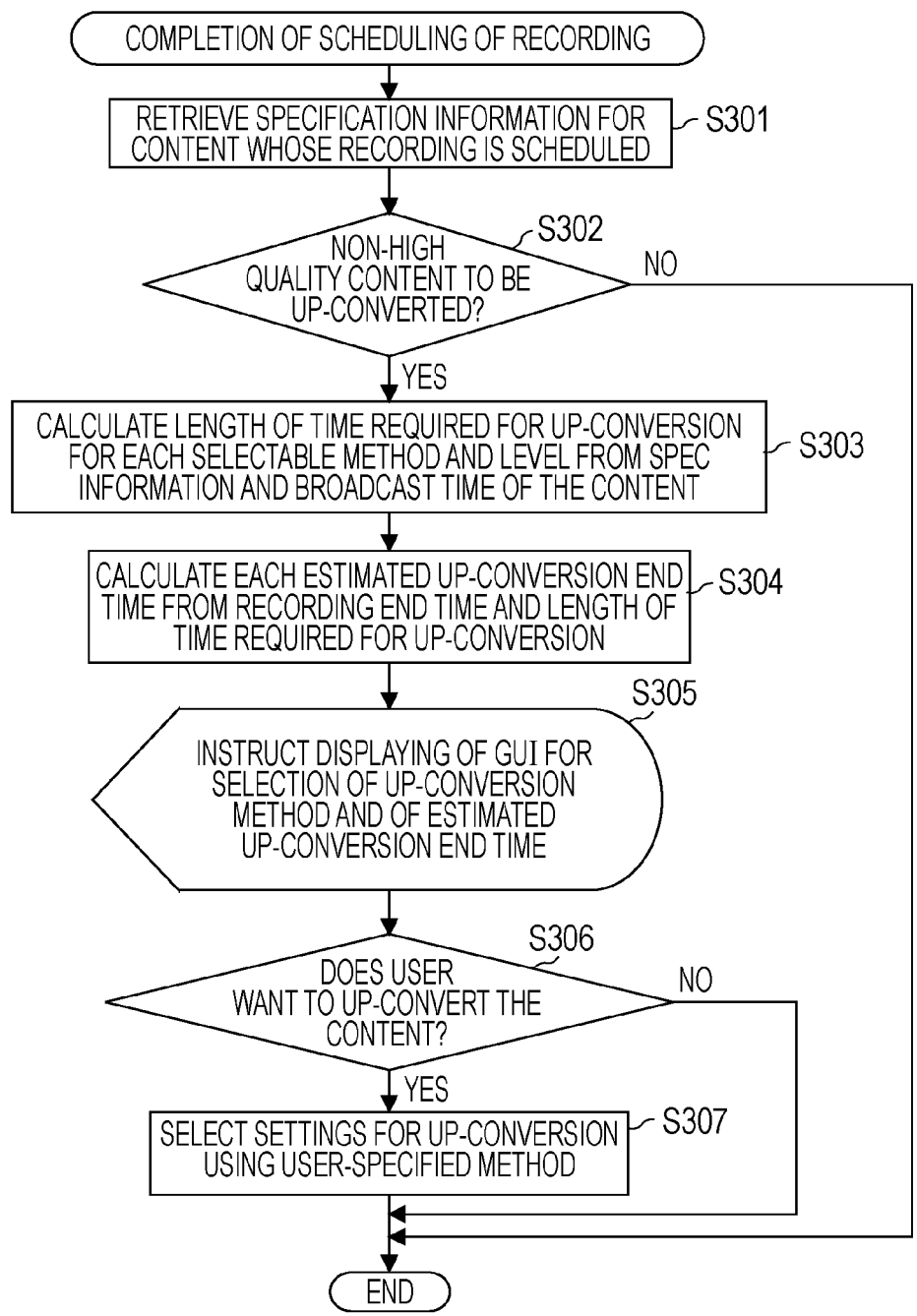
FIG. 13 is a flowchart of a process performed in a third embodiment of the present invention.

A procedure up to selection of execution or non-execution after completion of scheduling of recording will now be described with reference to a flowchart shown in FIG. 13. The flowchart of FIG. 11 corresponds to the flowchart of FIG. 5 described in the first embodiment.

First, in step S301, the recording and reproducing control unit 7 retrieves specification information matching with specification information for a content whose recording is scheduled (component type) stored in the operating instructions storing unit 8 from the ARIB standards information table stored in the content information storing unit 4. That is, step S301 is substantially the same as step S101.

In step S302, the recording and reproducing control unit 7 determines whether the content whose recording is scheduled is a non-high quality content to be up-converted. That is, step S302 is substantially the same as step S102. The description of the determination process is not repeated here.

In step S302, if the recording and reproducing control unit 7 determines that the content whose recording is scheduled is a non-high quality content to be up-converted, flow proceeds to step S303.

In step S302, if the recording and reproducing control unit 7 determines that the content whose recording is scheduled is a high quality content that there is no need to be up-converted, flow ends without selecting execution of the up-converting process, which will be described below.

In step S303, the recording and reproducing control unit 7 calculates the length of time required for the up-converting process of the content whose recording is scheduled from the broadcast start time and end time of the content whose recording is scheduled stored in the operating instructions storing unit 8 and the estimated time table.

In the present embodiment, a plurality of processing methods and processing levels are prepared for an up-converting process. For example, for a video content with the SD image quality, a user can select an up-converting process of up-converting the content into the HD image quality or that into the SHD image quality. That is, the necessity determination table shown in FIG. 7 stores necessary/unnecessary information indicating the necessity and the unnecessity of an up-converting process for each of the plurality of processing methods and processing levels. For example, the necessary/unnecessary information for a video content with the SD image quality indicates that both up-conversion into the HD image quality and up-conversion into the SHD image quality are "necessary". The necessary/unnecessary information for a video content with the HD image quality indicates that up-conversion into the HD image quality is "unnecessary" and up-conversion into the SHD image quality is "necessary".

As a result, in step S303, the length of time required for the up-converting process of a content whose recording is scheduled is calculated for each of the selectable processing methods and processing levels.

In the present embodiment, the length of time required for each of two types of up-converting processes of a video content with the SD image quality is calculated by way of example. The two types of up-converting processes are up-conversion into the HD image quality and that into the SHD image quality. This calculation is enabled by addition of time information for each processing level into the estimated time table illustrated in FIG. 8. That is, it is necessary to store time information for conversion into the HD image quality and conversion into the SHD image quality.

Conversion of a video content with the HD image quality into the HD image quality is ineffective. As a result, in steps S302 and S303, it is determined whether there are a plurality of processing methods and levels in accordance with specification information of a content whose recording is scheduled. When the determination shows that there is only one choice for the processing method, processing that is substantially the same as in the first embodiment is performed.

In step S304, the recording and reproducing control unit 7 calculates two estimated up-conversion end times from the broadcast end time of the content whose recording is scheduled stored in the operating instructions storing unit 8 and the calculated lengths of times required for two types of up-converting processes.

Figure 14:
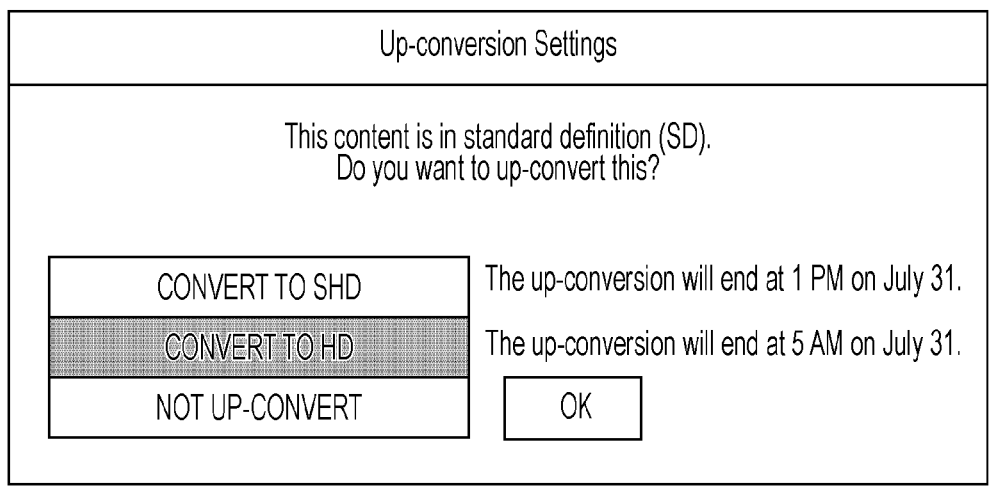
FIG. 14 shows an example of a setting screen for use in making the settings for an up-converting process according to the third embodiment.

In step S305, the recording and reproducing control unit 7 instructs the GUI generating unit 11 to generate GUI data that contains the two estimated up-conversion end times calculated in step S304. The GUI generating unit 11 generates the GUI data, as illustrated in FIG. 14. The generated GUI data is output to the display via the output unit 12. As illustrated in FIG. 14, the user can select one from among executions of two types of up-converting processes and non-execution of an up-converting process.

In step S306, if the user requires an up-converting process into the HD image quality or that into the SHD image quality in the GUI for up-converting settings, flow proceeds to step S307.

In step S307, the recording and reproducing control unit 7 can, for example, add an up-conversion flag to the content ID in the content management table illustrated in FIG. 10. The up-conversion flag in the present embodiment is a flag that can identify a user-selected up-converting process. This enables selection of execution of the up-converting process on the video content whose recording is scheduled.

In step S306, if the user requests non-execution of an up-converting process, flow ends without selecting execution of the up-converting process. As a result, the video content whose recording is scheduled is not up-converted.

In the present embodiment, depending on specification information for a video content to be recorded, displaying and non-displaying of a GUI that inquires of the user about whether or not to execute an up-converting process is selectively switched. This enables the user to know the effectiveness of the up-converting process of the video content when the video content is recorded in the recording unit without intention. In addition, the user can select execution or non-execution of an up-converting process of a video content together when scheduling recording of the video content.

When there are a plurality of types for up-converting processes, the user can easily select an up-converting process by referring to automatically provided executable processing methods and levels and necessary times for the video content.

In the present embodiment, there are two applicable types of up-converting processes to a video content with the SD image quality; one is conversion into the HD image quality and the other is conversion into the SHD image quality. However, applicable processing algorithms can be selected. In addition to video up-conversion, an audio up-converting process can be used in combination with the video up-converting process.

Other Embodiments

In the first to third embodiments described above, at the time the user schedules recording of a video content, it is determined whether the video content is a content that can be up-converted from specification information for the video content. However, the up-conversion settings can be selected even during recording of the video content, not in the scheduling of the recording.

For example, when, during recording of a video content, the user selects the video content being recorded and performs an operation for initiating the up-converting process of the video content being recorded, the recording and reproducing control unit 7 then retrieves specification information for the video content being recorded from the content information storing unit 4. Thereafter, processing of step S102 described in the first embodiment can be performed.

The up-conversion settings can be selected even after the completion of recording of a video content, other than at the time of scheduling of recording or during recording of the video content.

That is, the processing described in the above embodiments is executable if the user voluntarily performs an operation for selecting a video content to be subjected to determination whether or not to execute an up-converting process.

However, it is desired that scheduling of recording of a video content performed by the user be associated with an operation of selecting a video content. This is because automatic inquiry of the user about whether or not to execute an up-converting process triggered by an operation of scheduling of recording is more convenient to the user than independent setting of an up-converting process initiated by a voluntary operation of the user.

The above-described embodiments can also be realized in software performed by a computer (or a CPU or microprocessor unit (MPU)) in a system or an apparatus.

As a result, a computer program itself supplied to the computer to realize at least one of the above-described embodiments using a computer can realize the present invention. That is, a computer program itself for performing the functions of at least one of the above-described embodiments is included in the present invention.

A computer program for realizing at least one of the above-described embodiments can have any form, such as object code, a program executable by an interpreter, and script data suppliable to an operating system (OS), as long as it is readable by a computer.

A computer program for realizing at least one of the above-described embodiments can be supplied from a storage medium or over wire/wireless communication to a computer. Examples of the storage medium for supplying the program include, but are not limited to, a floppy disk, a hard disk, a magnetic recording medium (e.g., magnetic tape), an optical/magneto-optical storage medium (e.g., an magneto-optical disk (MO), a compact disk (CD), and a digital versatile disk (DVD)), and a non-volatile semiconductor memory.

One example of a method for supplying the program using wire/wireless communication is to use a server on a computer network. In this case, a data file (program file) that can be a computer program forming an aspect of the present invention is stored in the server. The program file may be executable code or source code.

The program file can be supplied to a client computer that accesses the server by being downloaded to the client computer. In this case, the program file can be divided into segment files, and the segment files can be distributed to different servers.

That is, a server device that supplies the program file for realizing at least one of the above-described embodiments to a client computer is included in the present invention.

Storage media in which an encrypted computer program for realizing at least one of the above-described embodiments is stored can be distributed to users. In this case, information regarding a decryption key can be supplied to a user who satisfies a predetermined condition, thus enabling the program to be installed in a computer of the user. The information regarding the key can be supplied by being downloaded from a website over the Internet.

A computer program for realizing at least one of the above-described embodiments may use the functions of an OS running on a computer.

A computer program for realizing at least one of the above-described embodiments may be formed in part by firmware in an expansion board mounted on a computer or be executed by a CPU included in the expansion board.

As described above, according to a video recording and reproducing apparatus and a method for controlling the apparatus of at least one of the embodiments, a video content to be up-converted can be automatically identified, and the user can easily make up-conversion settings.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-338677 filed Dec. 15, 2006, which is hereby incorporated by reference herein in its entirety.

What is claimed is:

1. A video recording and reproducing apparatus capable of obtaining video content data, recording the video content data in a recording unit, and executing an up-converting process on the recorded video content data into a high quality image by taking more time than actual time of the video content data, the video recording and reproducing apparatus comprising:

a selecting unit configured to select video content data;

a retrieving unit configured to retrieve specification information including at least either one of information related to the number of pixels and information related to aspect ratio for the video content data selected by the selecting unit;

a determining unit configured to determine whether or not to execute an up-converting process on the video content data in accordance with the specification information retrieved by the retrieving unit;

a generating unit configured to generate a setting screen that enables a user to select execution or non-execution of the up-converting process on the video content data with regard to the video content data on which the up-converting process is determined by the determining unit to be executed; and a calculating unit configured to calculate an estimated length of time required for the up-converting process on the video content data on which the up-converting process is determined by the determining unit to be executed, wherein the calculating unit is configured to, when the video content data selected by the selecting unit is video content data to be up-converted, calculate the estimated length of time required for the up-converting process of the selected video content data on the basis of the specification information for the video content data and time information for the video content data.

2. The video recording and reproducing apparatus according to claim 1, wherein the selecting unit is configured to automatically select video content data that is selected to be recorded by an operation of scheduling recording of the video content data initiated by the user.

3. The video recording and reproducing apparatus according to claim 1, wherein the determining unit is configured to store in advance determination data that includes a plurality of specification information segments each associated with information indicating the necessity or unnecessity of the up-converting process and to perform determination using the specification information for the video content data retrieved by the retrieving unit and the determination data.

4. The video recording and reproducing apparatus according to claim 1, wherein the calculating unit is configured to determine whether there is an overlap between up-converting processes of a plurality of video content data and, when it is determined that there is an overlap, to set at least time at which the up-converting process on the selected video content data is to be executed such that the up-converting processes do not overlap each other.

5. The video recording and reproducing apparatus according to claim 1, wherein the calculating unit is configured to determine whether there is an overlap between up-converting processes on a plurality of video content data and, when it is determined that there is an overlap, to modify the estimated length of time required for each of the plurality of up-converting processes in accordance with a state of the overlap.

6. The video recording and reproducing apparatus according to claim 1, wherein the generating unit is configured to, when there are a plurality of up-converting processes executable on the video content data selected by the selecting unit, generate a setting screen that enables the user to select at least one of the plurality of up-converting processes.

7. A method for controlling a video recording and reproducing apparatus capable of obtaining video content data, recording the video content data in a recording unit, and executing an up-converting process on the recorded video content data into a high quality image by taking more time than actual time of the video content data, the method comprising:
    selecting video content data;
    retrieving specification information including at least either one of information related to the number of pixels and information related to aspect ratio for the video content data selected by the selecting step;
    determining whether or not to execute an up-converting process on the video content data in accordance with the specification information retrieved by the retrieving step;
    generating a setting screen that enables a user to select execution or non-execution of the up-converting process on the video content data with regard to the video content data on which the up-converting process is determined by the determining unit to be executed; and
    calculating an estimated length of time required for the up-converting process on the video content data on which the up-converting process is determined by the determining unit to be executed,
    wherein, when the video content data selected by the selecting step is video content data to be up-converted, the calculating step further comprises calculating the estimated length of time required for the up-converting process on the selected video content data on the basis of the specification information for the video content data and time information for the video content data.

8. The method according to claim 7, wherein the selecting step further comprises automatically selecting video content data that is selected to be recorded by an operation of scheduling recording of the video content data initiated by the user.

9. The method according to claim 7, wherein the determining step further comprises storing in advance determination data that includes a plurality of specification information segments each associated with information indicating the necessity or unnecessity of the up-converting process and to perform determination using the specification information for the video content data retrieved by the retrieving step and the determination data.

10. The method according to claim 7, wherein the calculating step further comprises determining whether there is an overlap between up-converting processes on a plurality of video content data and, when it is determined that there is an overlap, the calculating step further comprises setting at least time at which the up-converting process on the selected video content data is to be executed such that the up-converting processes do not overlap each other.

11. The method according to claim 7, wherein the calculating step further comprises determining whether there is an overlap between up-converting processes on a plurality of video content data and, when it is determined that there is an overlap, the calculating step further comprises modifying the estimated length of time required for each of the plurality of up-converting processes in accordance with a state of the overlap.

12. The method according to claim 7, wherein the generating step further comprises, when there are a plurality of up-converting processes executable on the video content data selected by the selecting step, generating a setting screen that enables the user to select at least one of the plurality of up-converting processes.

13. The video recording and reproducing apparatus according to claim 1, wherein the calculating unit further calculates an estimated up-conversion end time from the calculated length of time required for the up-converting process, and the generating unit generates the setting screen that includes a display of the estimated up-conversion end time calculated by the calculation unit and enables a user to select execution or non-execution of the up-converting process for the video content data.

14. The method according to claim 7, wherein the calculating step further comprises calculating an estimated up-conversion end time from the calculated length of time required for the up-converting process, and the generating step generates the setting screen that includes a display of the estimated up-conversion end time calculated in the calculating step and enables a user to select execution or non-execution of the up-converting process for the video content data.

15. The video recording and reproducing apparatus according to claim 1, wherein the determining unit determines whether or not to execute an up-converting process on the video content data according to a table indicating a correspondence relation between the number of pixels, aspect ratio, and a necessity of up-converting process.

16. The method according to claim 7, wherein the determining step determines whether or not to execute an up-converting process on the video content data according to a table indicating a correspondence relation between the number of pixels, aspect ratio, and a necessity of up-converting process.

* * * * *